United States Patent Office 2,751,391
Patented June 19, 1956

2,751,391

DIPYRIDYL ALIPHATIC ALKYLENE POLYAMINE POLY ACIDS

Frederick C. Bersworth, Verona, N. J., assignor to The Dow Chemical Company, Midland, Mich., a corporation of Delaware No Drawing. Application July 13, 1953,
Serial No. 367,724

4 Claims. (Cl. 260—295)

This invention relates to chelating agents for metal ions in aqueous solution and has for its object the provision of water-soluble aliphatic alkylene polyamino poly acid compounds which form stable water-soluble alkali metal and ammonium base salts and chelate compounds with basic compounds and metal ions in aqueous solution.

Another object is to provide an aliphatic alkylene polyamine poly acid which contains pyridyl substituent groups which form water-soluble salts and metal chelate compounds with metal ions in aqueous solutions.

Still another object is to provide a dipyridyl aliphatic alkylene polyamino poly acid which is water-soluble.

Other objects will be apparent as the invention is more fully hereinafter disclosed.

In accordance with these objects, I have discovered that when two (2) of the amino hydrogens of an aliphatic alkylene poly amine are displaced by an alkylene group of from 1 to 12 carbon atoms in which group is substituted a pyridyl group and the remaining amino hydrogens by acetic acid or propionic acid or another acid of the same series, the resulting dipyridyl substituted aliphatic alkylene polyamino polyacetic acid is water-soluble and forms water-soluble alkali metal salts with bases, such as the several alkali metal hydroxides, carbonates, ammonium hydroxide and carbonate, and amines, and forms metal chelate compounds with metal ions in aqueous solution, which are soluble and resistant to decomposition by normal precipitating agents therefor.

The general formula for the dipyridyl aliphatic alkylene polyamine poly acids of the present invention is:

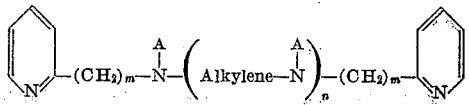

where A=—CH₂·COOH, —CH₂CH₂COOH or a higher acid of the same fatty acid series, an alkali metal salt, an ammonium salt or amine salt thereof; m may range from 0 to 12 or more; alkylene is a lower alkyl group which adds 2-3 carbon atoms to the chain, such as ethylene, propylene, trimethylene; and n=1, 2, 3, 4 or more.

In general, my discoveries indicate the following remarkable facts concerning these dipyridyl compounds:

(1) That for all stated values of A and n, and for m=1, it has been found that the chelating agents are quite water-soluble;

(2) That the metal chelates of (1) are also quite soluble in water;

(3) That as the number of carbon atoms in m increases, both the chelating agent and also the metal chelate become less soluble in water but at the same time become emulsifying and surface active. For example, when m=12; n=1; and A=acetic acid residue or alkali metal salt, ammonium salt or amine salt thereof, the product is a good foaming and emulsifying agent, and sequesters heavy metals to form chelates which are also good foaming and emulsifying agents. Its chelates with heavy metals of the transition series of the periodic table are very stable. However, this chelating agent has little affinity for alkaline earth metals, and combines only weakly with the rare earths;

(4) I have found that increasing n in general increases water-solubility and chelating power for heavy metals;

(5) I have also found that when alkylene is ethylene and propylene, the stability of metal chelates is higher than when it is trimethylene;

(6) Also, the stability of the chelates is greater for A=acetic acid than for A=propionic acid;

(7) When A=propionic acid and alkylene=trimethylene simultaneously, chelating power is in general the weakest; it is strongest when A=acetic acid and alkylene=ethylene;

(8) In the case of the derivatives of ethylenediamine diacetic acid (alkylene=ethylene, A=—CH₂·COOH, and n=1) I have found remarkable differences for combination with various metal ions for the chelating agents resulting from a change in m. Thus for the structure:

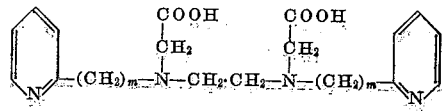

The chelating power may be varied greatly by changing m. When m=0, the copper chelate is very stable, and, while the cobalt and nickel chelates are also quite stable, and not dissociated in aqueous solution, their stabilities are relatively much lower than that of the copper chelate.

A change of m to 1 to insert —CH₂— profoundly affects the chemical properties of the compound. The stability of the copper chelate is increased somewhat. On the other hand, the stabilities of the nickel and cobalt chelates are so great that they are now more stable than the copper chelate. For the equilibrium:

$$M + Ke \rightleftarrows MKe$$

where M=Co or Ni; and Ke is the chelating agent described above for which m=1, I have found for the equilibrium constant $$K \text{ equilibrium} = \frac{(MKe)}{(M) \cdot (Ke)} = > 10^{20}$$

where (M) denotes molar concentration.

In the preparation of the compounds, advantage is taken of the fact that the acid form is of relatively low solubility in water and, accordingly, the compound is synthesized as the alkali metal salt in an aqueous medium maintained at a high alkaline pH. The compound is isolated by acidifying the medium strongly with hydrochloric acid, or other mineral acid, to form the acid form of compound and it crystallizes actually as the acid form with the acid addition to the pyridine ring. For conversion to the pure alkali metal salt, the acid form of the compound may be dissolved in an aqueous solution containing an appropriate molar amount of an alkali metal hydroxide or carbonate, ammonium hydroxide or carbonate, or amine and, in this fashion, a sodium potassium, lithium, cesium, rubidium, ammonium and amine salts are prepared.

When m=2, to put —CH₂—CH₂— into the chain, I have found that the stability of the chelates is again much lower, and decreases to still lower values for longer chains between the aliphatic nitrogen and the pyridine ring.

Example I

Five moles of α-amino pyridine was carefully carboxymethylated with five moles of sodium cyanide and 5 moles of formaldehyde at room temperature in a rapidly stirred aqueous solution at pH 10.5 (according to the process described in my Patent No. 2,407,645). After complete removal of ammonia by distillation, the reaction solution containing the pyridyl acetic acid Na salts was treated without further purification with 2.5 moles ethylene dichloride and heated for ten hours at 100° C. in a rapidly stirred pressure vessel. The reaction product was primarily a pale yellow solution of ethylene-diamine-N, N'-bis-α-pyridyl-N, N'-diacetic acid and sodium chloride. The pure acid product may be isolated as the dihydrochloride by acidification of the solution with hydrochloric acid, and is easily purified further by fractional crystallization, or as the copper salt. The structural formula of the acid conforms to the following:

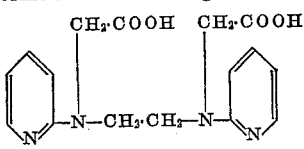

The alkali metal salt is formed by dissolving the acid in an equal molar amount of an aqueous solution of an alkali metal hydroxide, carbonate, and ammonium base salts by dissolving in ammonium hydroxide or carbonate, or amine.

*Example II*

Two moles of amino-α-picoline are treated with two moles NaCN and formaldehyde as in Example I. The reaction product (sodium salt) is then treated with ethylene dichloride as in Example I. The product is believed to have the formula:

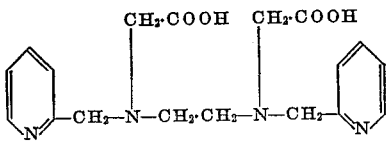

It may be crystallized as the acid from hydrochloric acid solutions. The alkali metal salt is formed by dissolving the acid in an equal molar amount of an aqueous solution of an alkali metal hydroxide, or carbonate, and ammonium base salts by dissolving it in ammonium hydroxide or carbonate, or amine.

*Example III*

Two moles of chloro-α-picoline (having chlorine in the side chain) are treated with one mole of ethylene diamine-N, N'-dipropionic acid in a rapidly stirred aqueous solution buffered to about pH 9 at about 50° C. After twelve (12) hours the reaction was considered complete and a crystallizable product was obtained on acidification with HCl which is believed to have the formula:

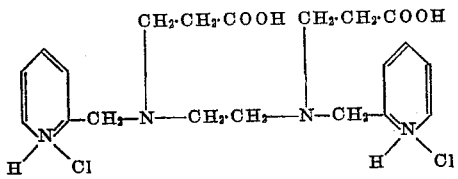

The alkali metal salt is formed by dissolving the acid in an equal molar amount of an aqueous solution of an alkali metal hydroxide, or carbonate, and ammonium base salts by dissolving it in ammonium hydroxide or carbonate, or amine.

*Example IV*

Ten moles of β-amino-6-ethylpyridine was treated by slow addition of two moles of ethylene chloride at about 50° C. over a period of two hours, followed by heating in a pressure vessel for eight hours at 100° C. The reaction mixture was then treated with four moles of caustic soda, and the excess β-amino-6-ethylpyridine was recovered by distillation. The residue was separated from the sodium chloride which separated, dissolved in four parts of water by volume, and treated with four moles of sodium cyanide and four moles of formaldehyde (as described in my United States Patent No. 2,407,645). On acidification with hydrochloric acid a crystalline product was isolated which is believed to have the formula:

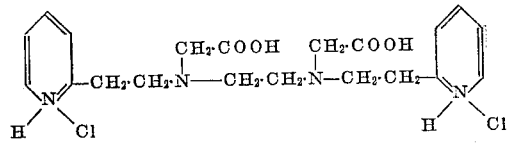

The alkali metal salt is formed by dissolving the acid in an equal molar amount of an aqueous solution of an alkali metal hydroxide or carbonate, and the ammonium base salts by dissolving in ammonium hydroxide or carbonate or an amine.

*Example V*

Two moles of 2-acetyl pyridine are treated with one mole of diethylene triamine to give the Schiff base:

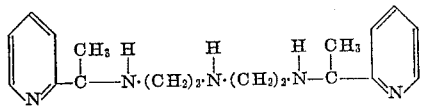

This material is prepared in aqueous solution and is not isolated. It is then carefully reduced catalytically at moderate temperatures (somewhat above room temperature) with a promoted nickel catalyst to the di(pyridylalkyl) diethylene triamine derivative. The reaction was stopped after two moles of hydrogen was absorbed. The aqueous product was then filtered and treated directly (according to my United States Patent No. 2,407,645) with three moles of NaCN and three moles of formaldehyde to give, after acidification, a crystalline product believed to have the following composition:

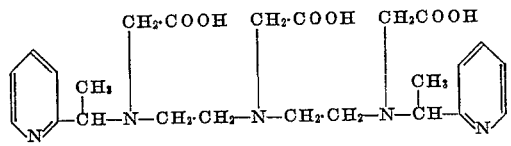

The alkali metal salt is formed by dissolving the acid form in an equal molar amount of an aqueous solution of an alkali metal hydroxide or carbonate, and the ammonium bases by reacting it with ammonium hydroxide or carbonate or amine. For the preparation of polyalkyl polyamine derivatives generally the same procedure is used with tri, tetra, penta, etc. compounds to get the central skeleton —N—Alkylene-N——N The following reactions are examples of the type of chelates formed with heavy metals:

Cu$^{II}$+compound of Example II→

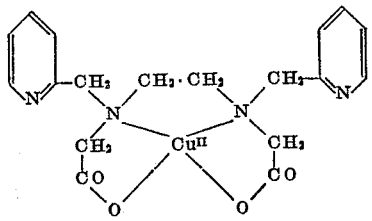

or

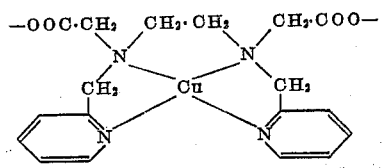

Co$^{II}$ and Ni$^{II}$ with compound of Example II, for example:

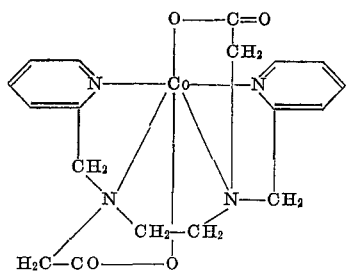

Thus it can be seen that the chelating agent provides four bonds for copper (usually considered the maximum for copper) but that six bonds are available for combining with the other transition metals. It is felt that this offers a qualitative interpretation of the relatively stronger chelation with Co and Ni than is usual for chelating agents. Another factor which is believed important is that four nitrogens are here available for bond formation whereas in ethylenediamine tetra acetic acid, a more common and better known chelating agent—only two donor nitrogens are present.

In the case of other chelating agents of this disclosure which have weaker tendencies for combining with metals, it is felt that the active groups may not be as favorably situated for forming strong chelate compounds with metals. Thus the observations given above on relative stabilities may serve as a guide for further understanding the structural requirements favorable for combination of organic reagents with metals.

It is to be understood that the examples illustrating synthesis with ethylene and trimethylene nuclei are equally applicable to substituted ethylene and trimethylene as well, e. g.,

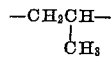

or

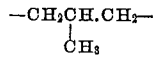

It is to be noted from the several examples that the acid form of the compound, its partial salt or completely neutral salt may be prepared. Thus, for the neutral salt, sufficient alkali (whether alkali metal base or ammonium base) must be used to neutralize all of the acid functions of the compound. In Example I, two acetic acid functions appear. Hence, to prepare the neutral salt, the acid addition functions plus the acetic acid must be neutralized, and the equal molar amount of base would be four moles per mole of compound. The mono acid salt would be formed by reaction with three moles of base. In Examples II, and IV four moles of base would be required for the neutral salt. In Example V, three moles of base would be required for the neutral salt. The preparation of the salts is carried out as a regular acid-base titration and inflections in the acid-base titration curve identify the formation of the mono-, di-, and tri-salts. Isolation of the salts calls merely for recrystallization.

This application is a continuation in part of application Serial No. 183,079, filed September 2, 1950, and now abandoned.

Having hereinabove described the present invention generically and specifically and given specific examples thereof, it is believed apparent that the same may be widely varied without essential departure therefrom and all such modifications of and departures from the same are contemplated as may fall within the scope of the following claims.

What is claimed is:

1. Compounds conforming to the structural formula:

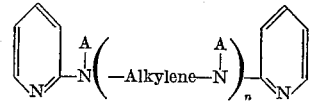

wherein A is selected from the group consisting of —CH$_2$COOH, and —CH$_2$CH$_2$COOH, alkylene is a lower molecular weight bivalent alkylene group which places 2 to 3 carbon atoms in the chain directly between the indicated nitrogen atoms, and $n$ is an integer having a value in the range from at least 1 to about 4, and the alkali metal and ammonium base salts and acid addition products of the acid forms of said compounds.

2. The compound conforming to the structural formula:

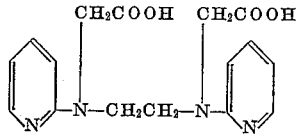

3. The compound conforming to the structural formula:

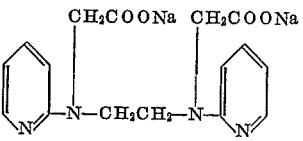

4. The compound conforming to the structural formula:

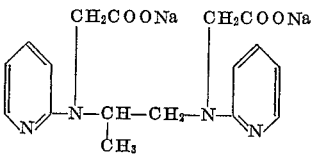

References Cited in the file of this patent

UNITED STATES PATENTS 2,520,902     Bersworth _____ Sept. 5, 1950